Figure 9:
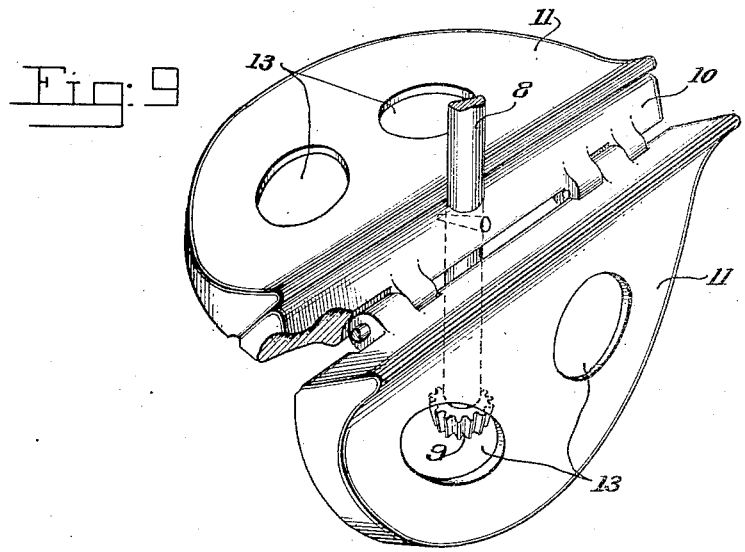

D. B. WHISTLER.
COMBINATION FARE BOX RECORDER.
APPLICATION FILED OCT. 9, 1914.
1,291,317.
Patented Jan. 14, 1919.
14 SHEETS—SHEET 1.
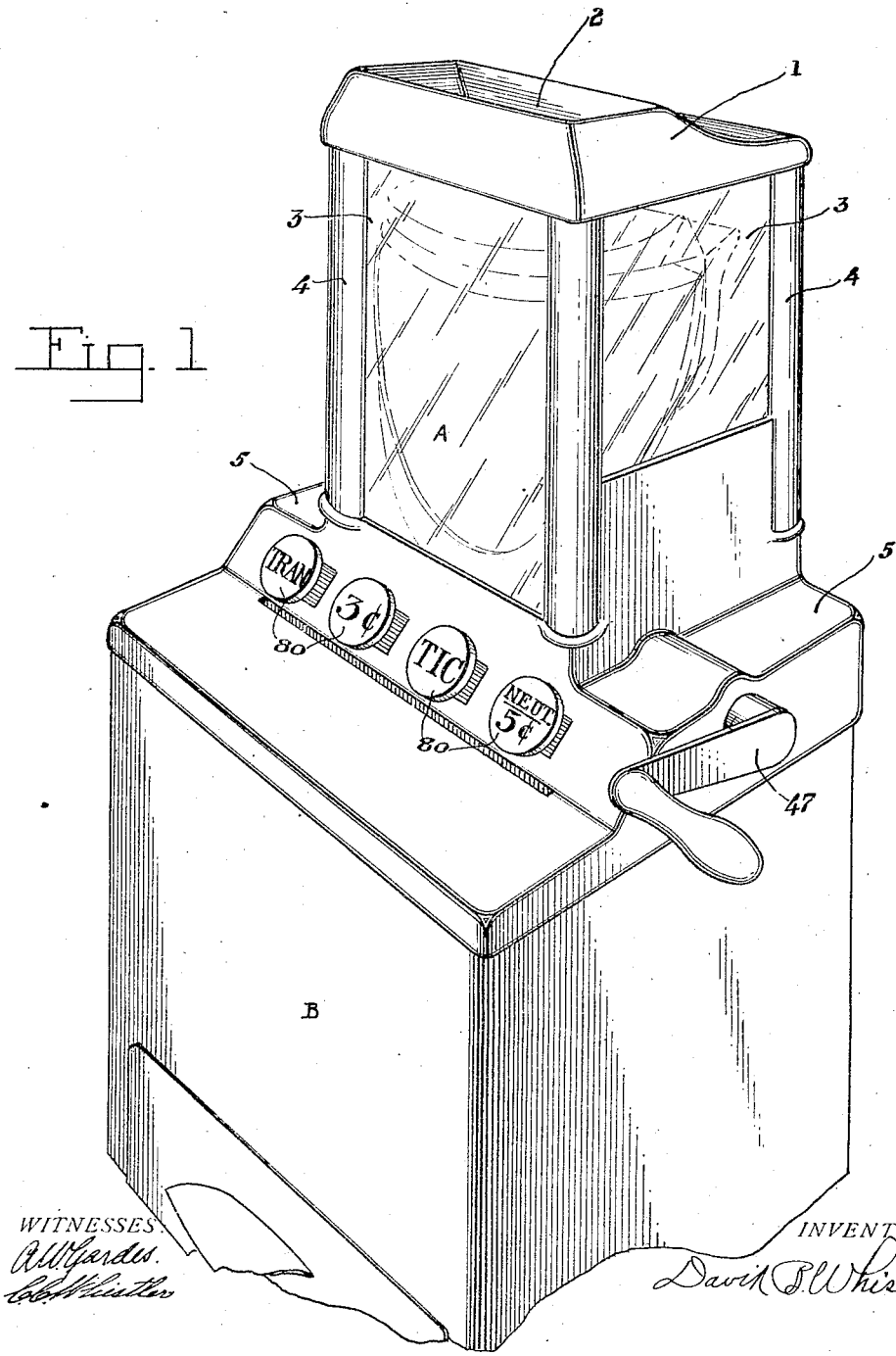

D. B. WHISTLER.
COMBINATION FARE BOX RECORDER.
APPLICATION FILED OCT. 9, 1914.
1,291,317.
Patented Jan. 14, 1919.
14 SHEETS—SHEET 2.
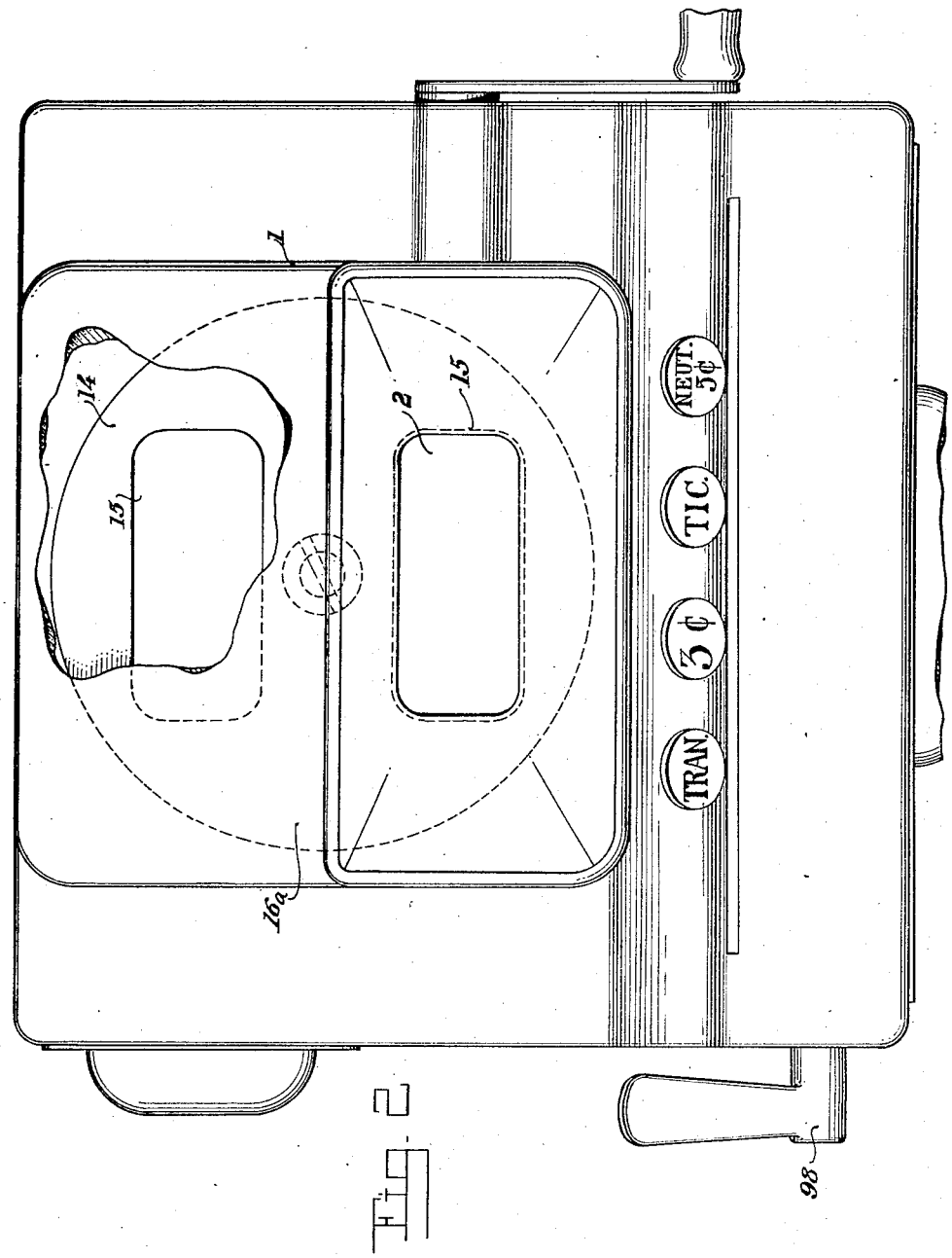
WITNESSES.
INVENTOR.

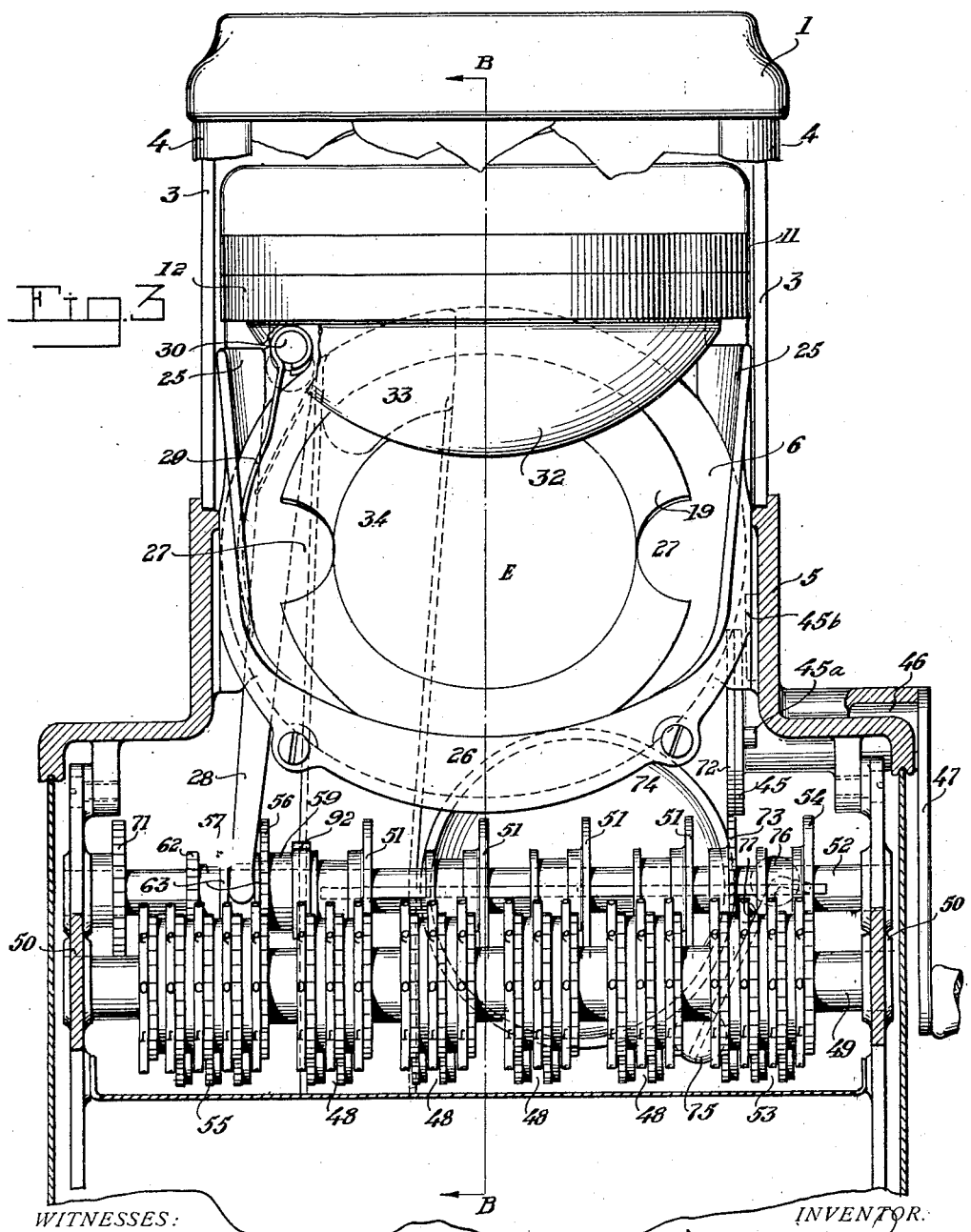

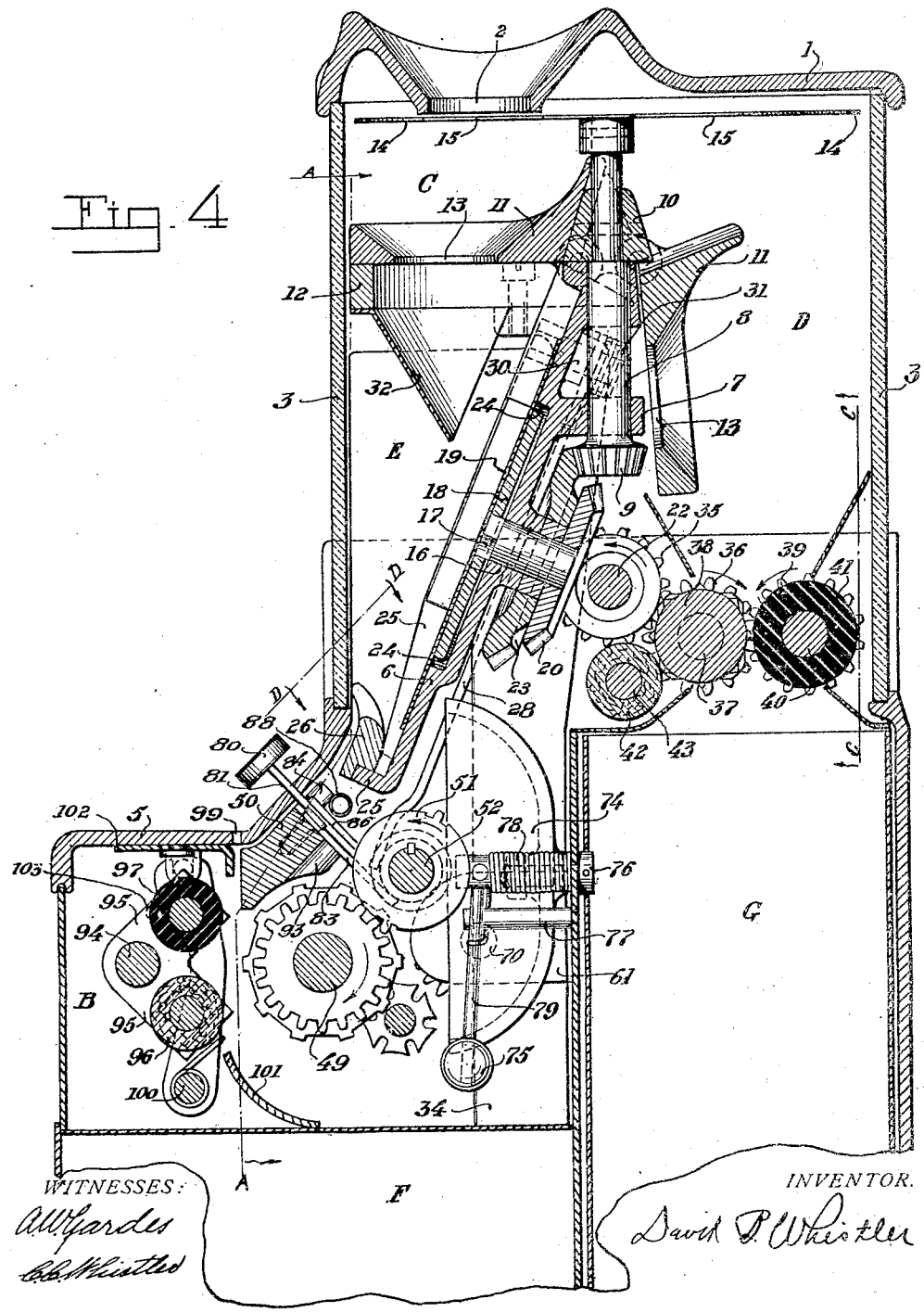

D. B. WHISTLER.
COMBINATION FARE BOX RECORDER.
APPLICATION FILED OCT. 9, 1914.
1,291,317.
Patented Jan. 14, 1919.
14 SHEETS—SHEET 5.
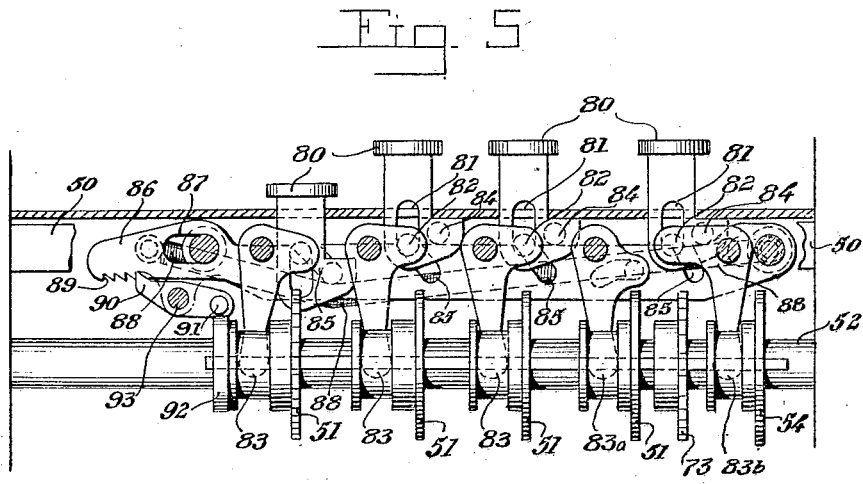
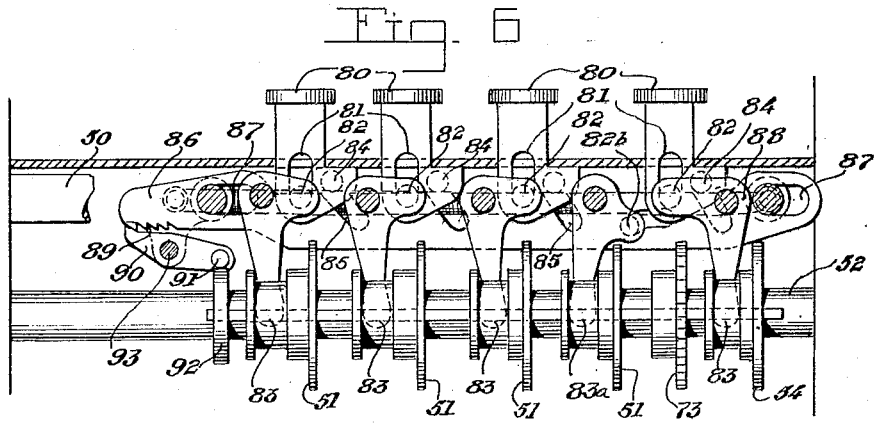
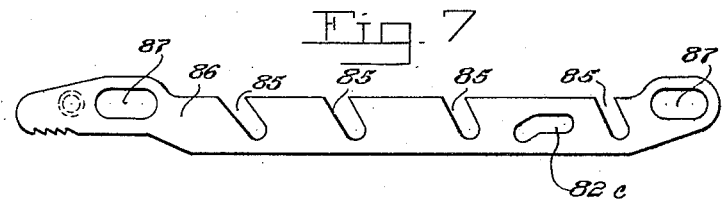
WITNESSES:
INVENTOR.

D. B. WHISTLER.
COMBINATION FARE BOX RECORDER.
APPLICATION FILED OCT. 9, 1914.

1,291,317.

Patented Jan. 14, 1919.
14 SHEETS—SHEET 6.

WITNESSES:

INVENTOR.
David B. Whistler

D. B. WHISTLER.
COMBINATION FARE BOX RECORDER.
APPLICATION FILED OCT. 9, 1914.

1,291,317.

Patented Jan. 14, 1919.
14 SHEETS—SHEET 7.

WITNESSES:
A. W. Gardes
C. C. Whistler

INVENTOR.
David B. Whistler

D. B. WHISTLER.
COMBINATION FARE BOX RECORDER.
APPLICATION FILED OCT. 9, 1914.
1,291,317.
Patented Jan. 14, 1919.
14 SHEETS—SHEET 8.
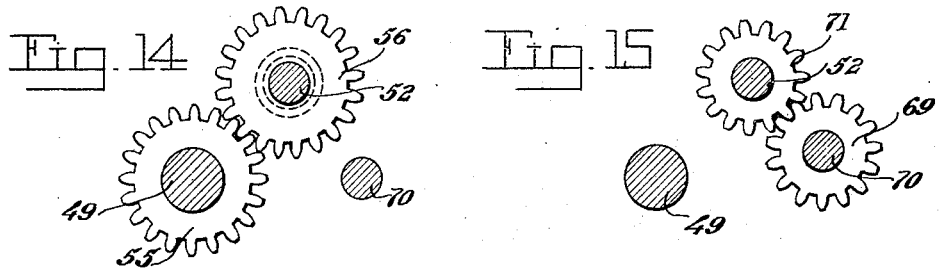
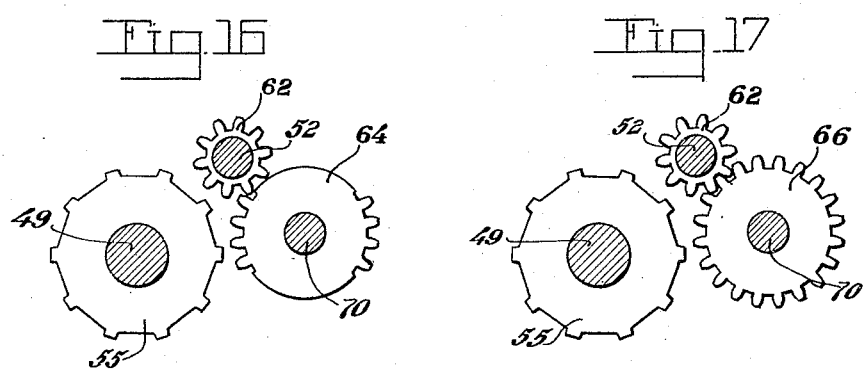
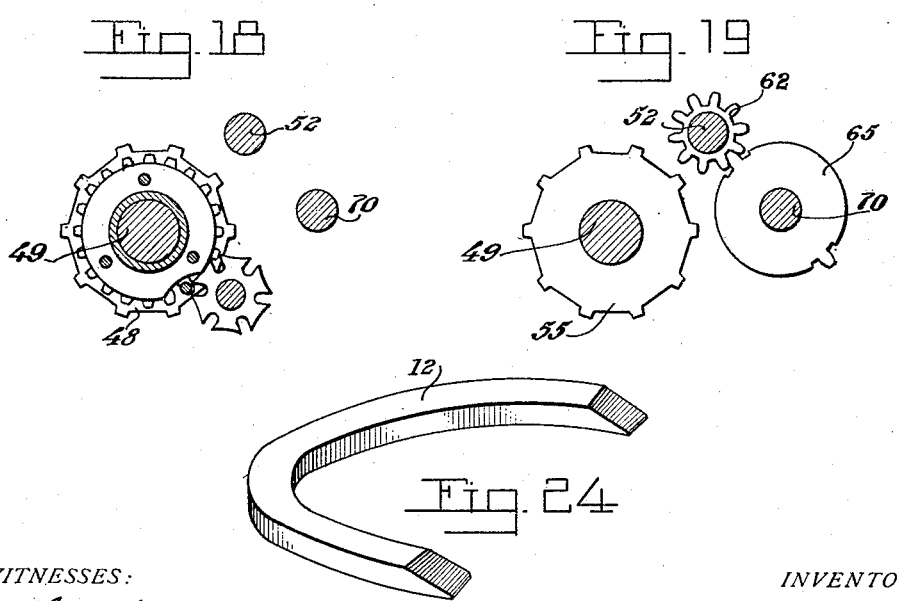
WITNESSES:
INVENTOR.

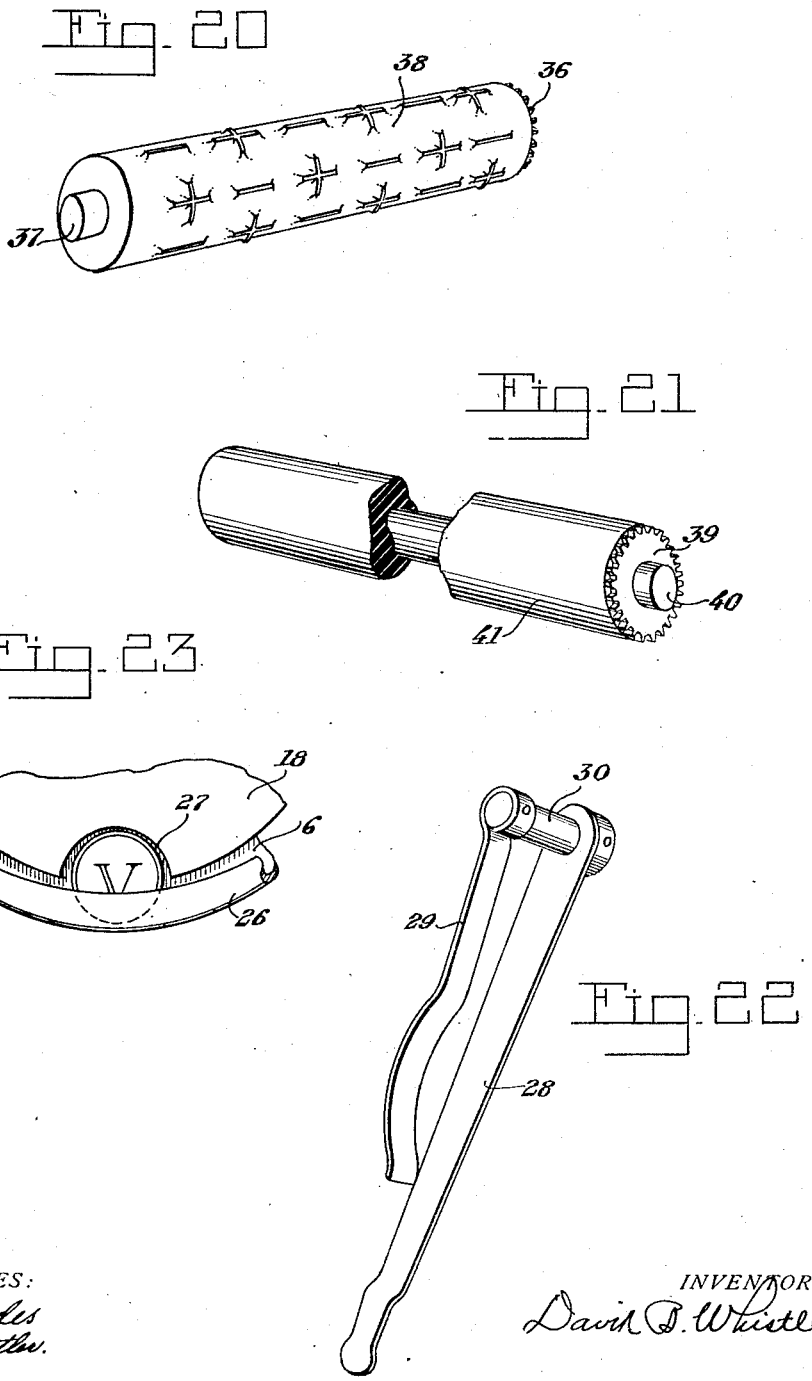

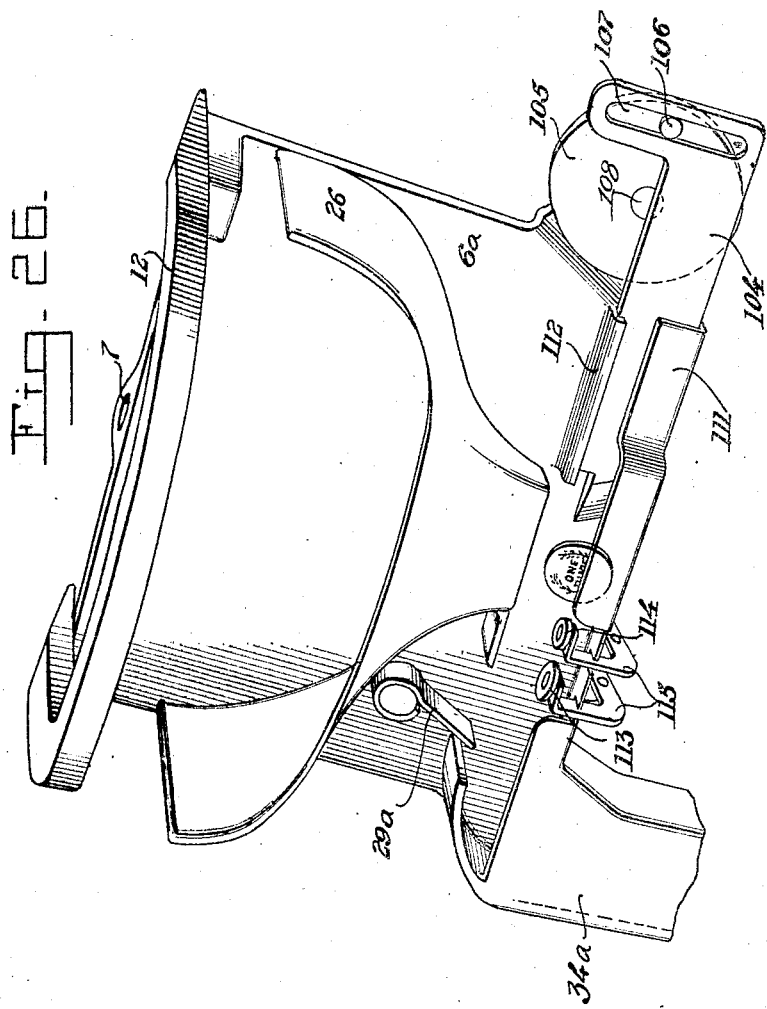

D. B. WHISTLER.
COMBINATION FARE BOX RECORDER.
APPLICATION FILED OCT. 9, 1914.
1,291,317.
Patented Jan. 14, 1919.
14 SHEETS—SHEET 11.
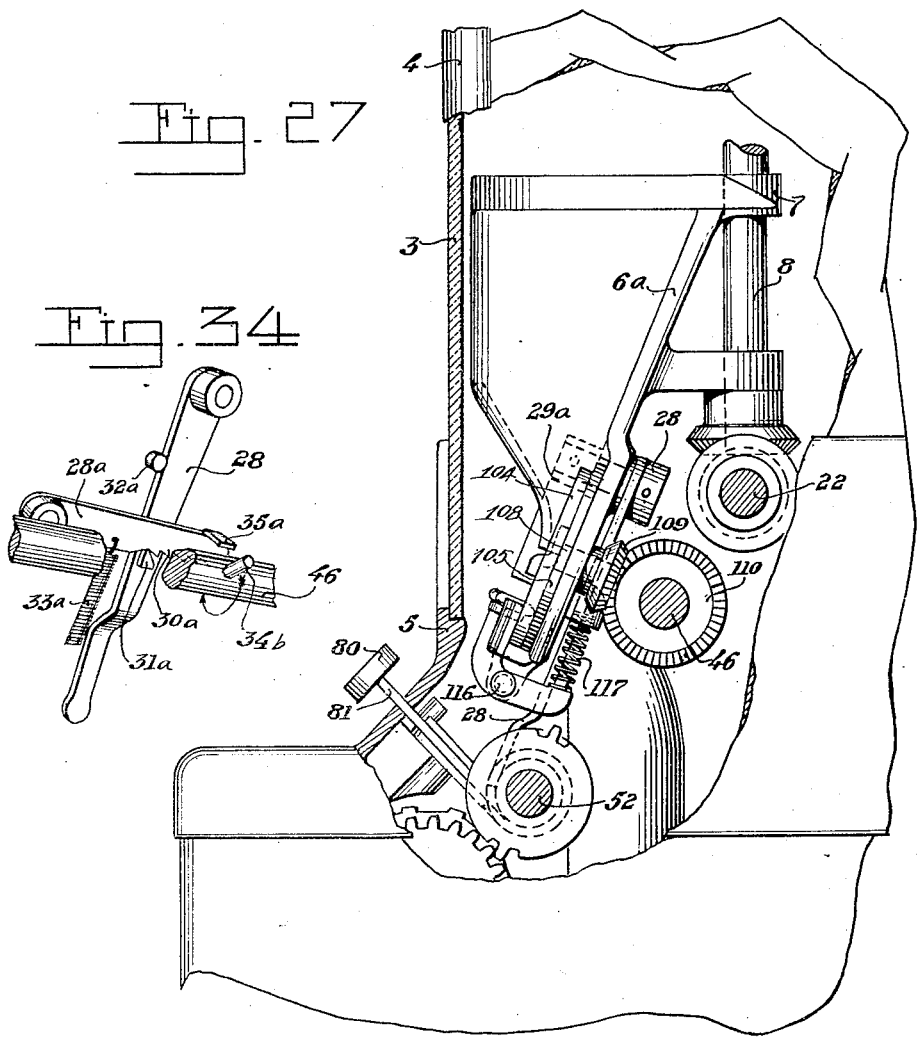
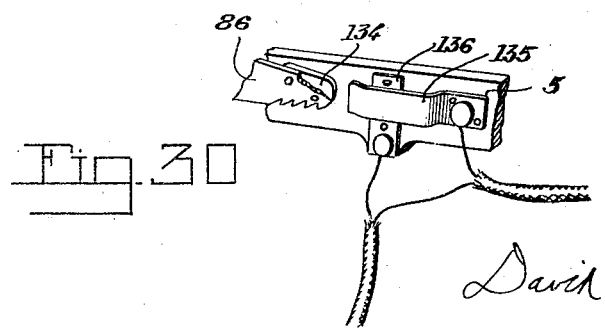
WITNESSES:
INVENTOR.

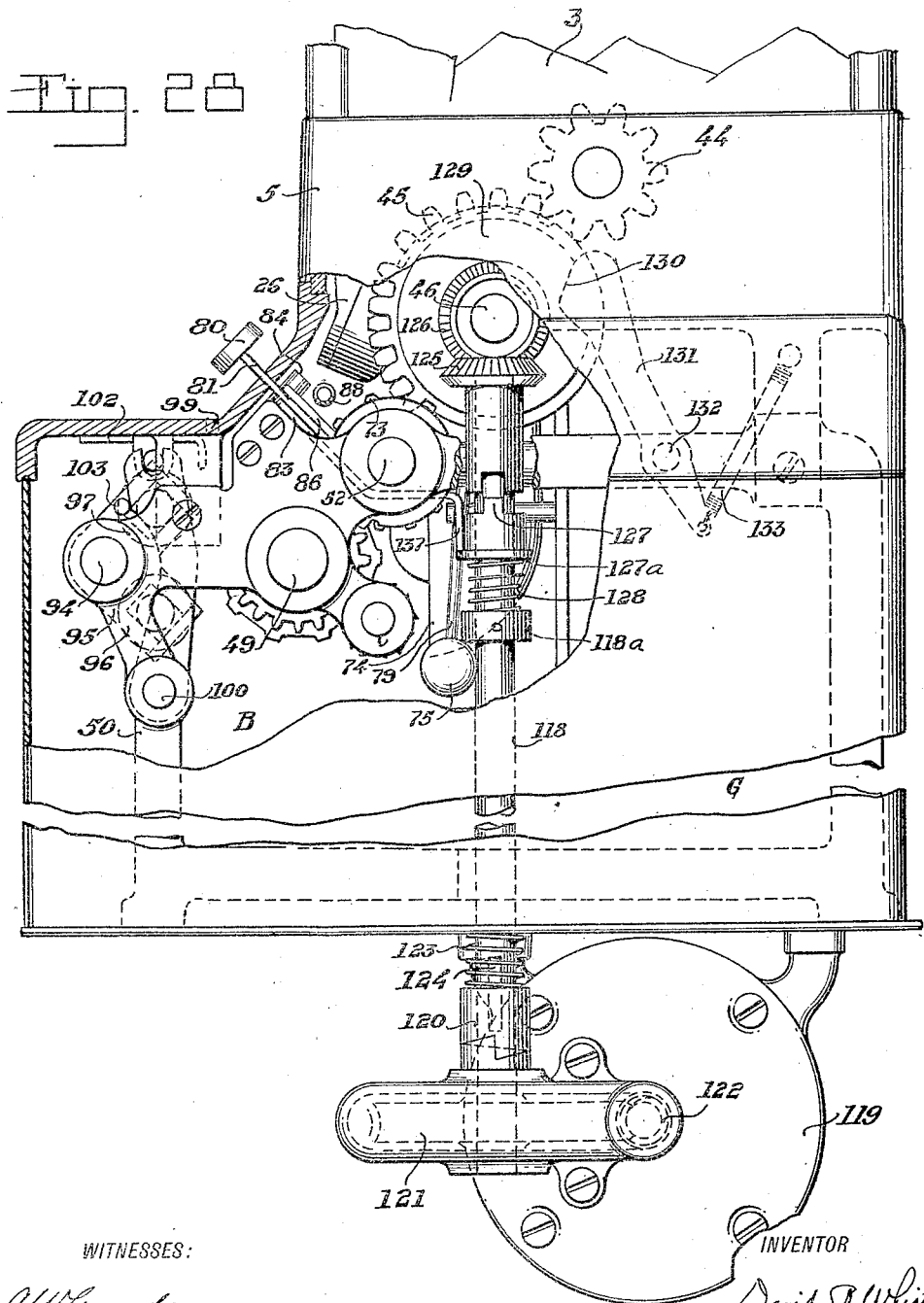

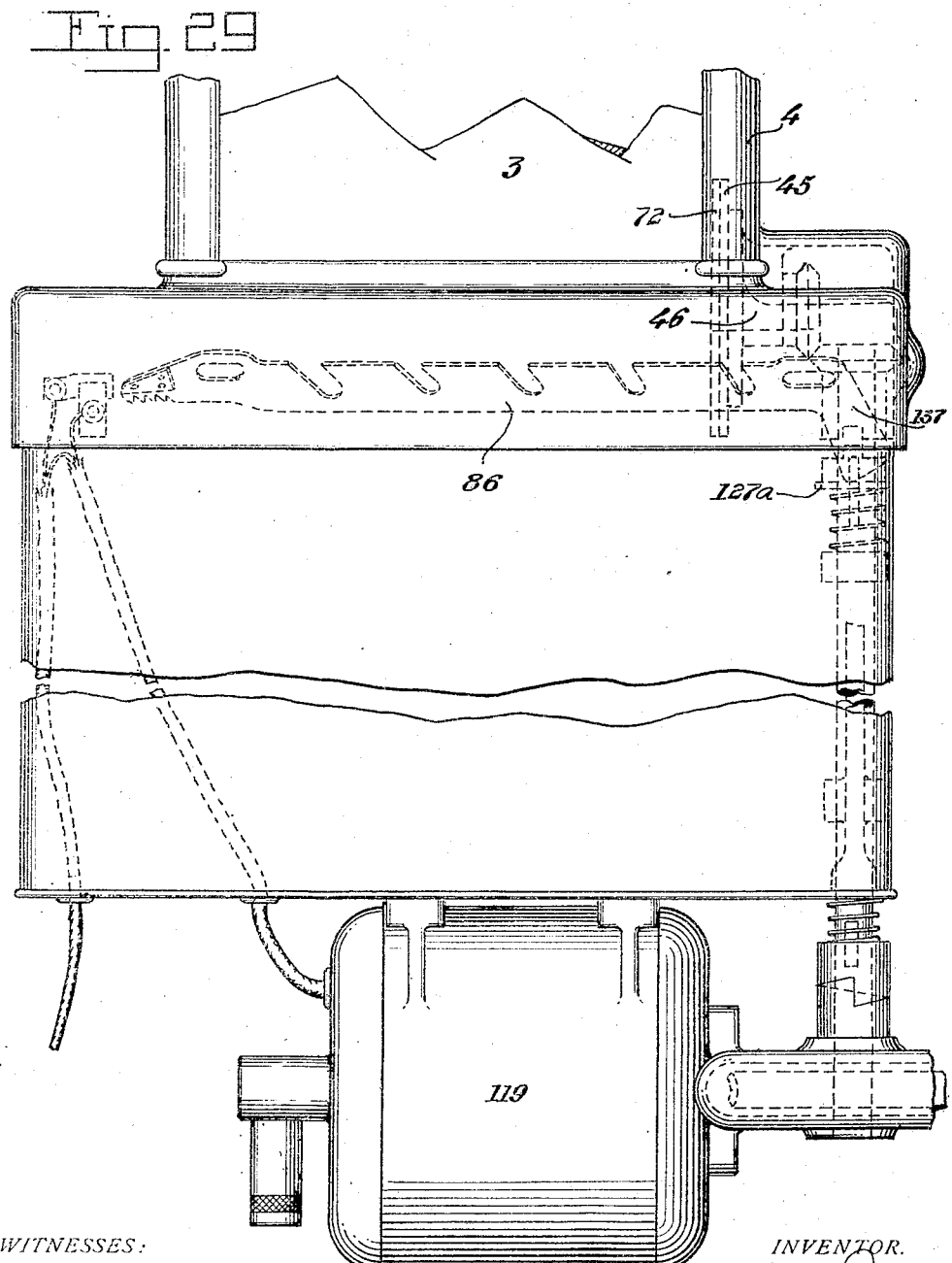

D. B. WHISTLER.
COMBINATION FARE BOX RECORDER.
APPLICATION FILED OCT. 9, 1914.
1,291,317.
Patented Jan. 14, 1919.
14 SHEETS—SHEET 14.
Fig. 31
DAYTON ELECTRIC RAILWAY CO.
| TRIP | FARE BOX | TRANSFER | 3 CENTS | TICKETS | 5 CENTS | TOTAL REGISTER | GAUGE |
|---|---|---|---|---|---|---|---|
| 1 | 329.60 | 344 | 136 | 297 | 481 | 4034 | |
| 2 | 331.14 | 350 | 144 | 309 | 507 | 4086 | |
| 3 | 333.69 | 360 | 149 | 324 | 555 | 4164 | |
| 4 | 337.13 | 375 | 157 | 336 | 619 | 4263 | |
| 5 | 339.38 | 384 | 162 | 352 | 661 | 4335 | 1 |
| 6 | 342.30 | 402 | 166 | 364 | 717 | 4425 | 2 |
| 7 | 346.00 | 423 | 176 | 386 | 785 | 4546 | 3 |
| 8 | 347.46 | 429 | 178 | 394 | 813 | 4590 | 4 |
| 9 | 349.42 | 444 | 185 | 408 | 848 | 4661 | 5 |
| 10 | 352.66 | 466 | 193 | 420 | 908 | 4763 | 6 |
| 11 | | | | | | | 7 |
| 12 | | | | | | | 8 |
| 13 | | | | | | | 9 |
| ★ | 326.45 | 342 | 126 | 293 | 424 | 3961 | 10 |
| TOT | 26.21 | 124 | 67 | 127 | 484 | 802 | 11 |
CON. NO. _4737_ NAME _John S. Doe_
MOT. NO. _1234_ NAME _Will R. Smith_
CAR NO. _562_ RUN NO. _5_ DATE _Sept. 26_ 1914
Fig. 32  Fig. 33
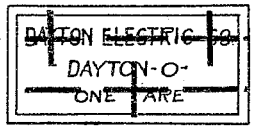
WITNESSES:
A.W. Gardes
INVENTOR.
David B. Whistler

UNITED STATES PATENT OFFICE.

DAVID B. WHISTLER, OF DAYTON, OHIO, ASSIGNOR TO THE AMERICAN RAILWAYS EQUIPMENT COMPANY, OF DAYTON, OHIO, A CORPORATION OF OHIO.

COMBINATION FARE-BOX RECORDER.

1,291,317. Specification of Letters Patent. Patented Jan. 14, 1919.

Application filed October 9, 1914. Serial No. 865,853.

*To all whom it may concern:*

Be it known that I, DAVID B. WHISTLER, a citizen of the United States, residing at Dayton, in the county of Montgomery and State of Ohio, have invented certain new and useful Improvements in Combination Fare-Box Recorders, of which the following is a specification, reference being had therein to the accompanying drawings.

This invention relates to improvements in recording fare registers and fare boxes, and has for its object to combine in a single device the functions of a multiple fare recorder and registering fare box, so constructed that the required operations for classifying and registering the fares can be performed with minimum effort and great facility.

It is the object of this invention to combine in a single device the functions of a multiple fare recorder, registering fare box and ticket receiving and canceling device, and to provide an exceedingly simple, strong and durable mechanism, in small compact form, not likely to get out of order under the severe conditions of service contemplated in its use.

A further object of the invention is to provide a registering fare box adapted to receive and register mechanically, on a coin-controlled counter, cash fares of a given series of denominations and to show at each operation the accumulated sum, in dollars and cents, of all the cash fares registered; also to provide an open cash drawer to which the coins are delivered after being registered, and to which the conductor has access.

It is also an object of this invention to provide a fare box having a single receptacle adapted to receive cash fares and tickets, and means to separate the cash fares from tickets in the normal operation of the mechanism; also to provide means to cancel the tickets so that the same cannot be used fraudulently after once having been received in payment of fare and registered.

It is furthermore an object of this invention to provide a combination fare box-recorder having a multiple fare registering and recording mechanism whereby each kind of fare is classified and registered separately, and the total of all the fares is registered, and a printed record is obtainable showing the result of the collections for each trip and for the entire period of work of each conductor. To this end, a suitable record card is provided for taking impressions from the register counters; the card having blank forms for traffic and other data to be filled in by the conductor, and being of convenient form and size for office checking and filing.

It is also an object of this invention to provide a series of selector keys for classifying the fares as the same are registered and to interlock the keys with suitable mechanism so that but one key may be operated at a time.

It is further a purpose of the invention to have one of the detail counters normally engaged with the operating mechanism, preferably the counter for registering the kind of fare of which the greatest number are used, in order to minimize the number of movements required to properly classify and register the fares.

Provision is made for disengaging the total register and the normally engaged detail register, so that the mechanism to remove the coins and tickets from the examination box, and the coin-controlled counter may be operated without affecting any of the detail registers or the total register. This provision is made to enable the conductor to clear the examination box of any fares remaining therein after the required number of operations have been made to properly register the fares.

My invention is essentially different from other registering fare boxes with reference to the fare receiver and examination box. I have combined the receiving box and examination box, also the ticket canceling box, in one section, thus eliminating the "coin hopper" common to registering fare boxes now on the market, and avoiding the difficulty experienced of coins clogging in the hopper when an excess of coins accumulate therein. By this arrangement also, the coin observation plate is dispensed with and the movement required to trip the plate is eliminated, materially reducing the amount of attention required from the conductor, and facilitating the collection of the fares during rush hours. In my invention each fare is classified and registered immediately as received by making one turn of the operating handle, which also serves to simultaneously actuate the mechanism for separating tickets from cash fares and to operate the mechanism for canceling the tickets. The completion of the registration is indicated by ringing of a bell.

Under certain conditions of operation, it is desirable to use a motor to actuate the mechanism of the register. For this purpose I use a modified form of construction adapted to be operated by an electrical motor, the key bar of the selector mechanism being employed to close and break the circuit when a fare is registered.

With these and other objects in view my invention consists in certain novel features, numerous organizations of parts, combinations and arrangements hereinafter described, and more particularly pointed out in the claims.

Figure 10:
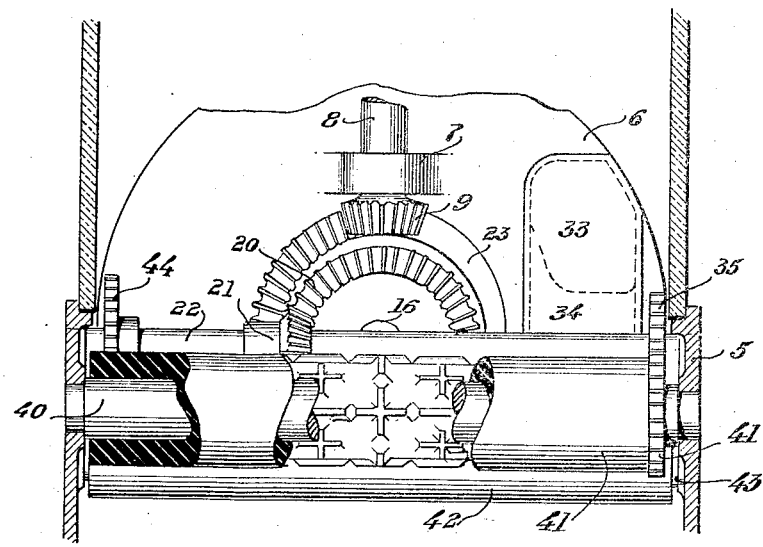
Figure 11:
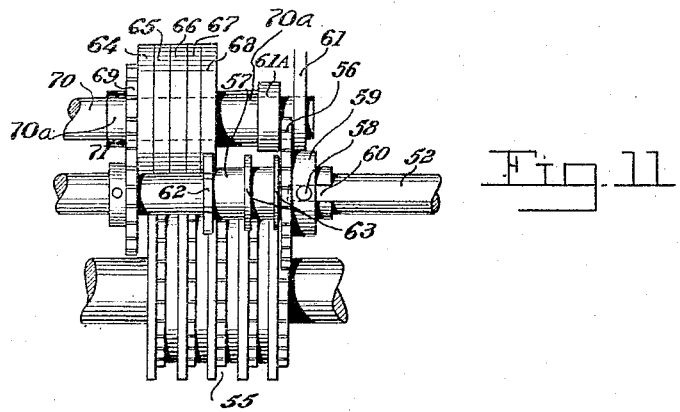
Figure 12:
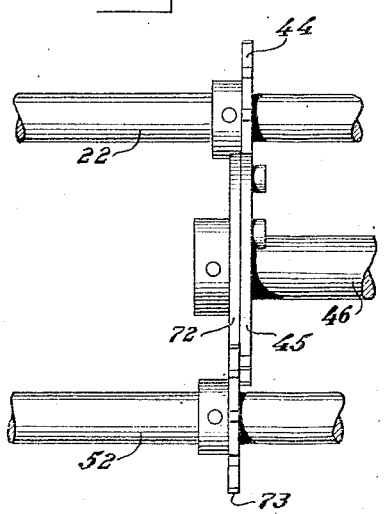
Figure 13:
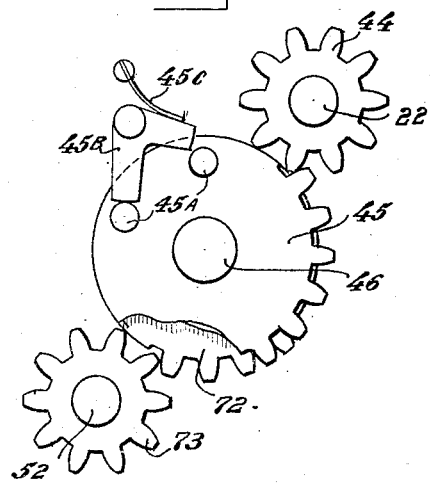
Figure 25:
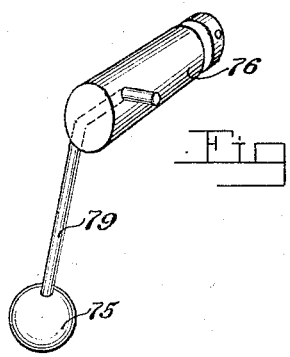

In the accompanying drawings, Figure 1 is a perspective view of my invention, showing the contour of the outer case and the arrangement of the selector keys and operating handle; Fig. 2 is a top plan view of the parts shown in Fig. 1; Fig. 3 is a front elevation of the mechanism, with the selector keys removed, taken in section on line A—A of Fig. 4; Fig. 4 is a side elevation of the mechanism taken on line B—B of Fig. 3, looking to the left; Figs. 5 and 6 are detail views of the key selector mechanism, Fig. 6 showing the normal position of the parts, and Fig. 5 the relation of the parts when one of the keys is depressed; Fig. 7 is a detail view of the key bar; Fig. 8 is a detail view of the key bar tripping cam; Fig. 9 is a detail view of the coin and ticket separating plates broken away to show a detail of construction; Fig. 10 is a detail view taken from the rear of the mechanism on line C—C of Fig. 4, with part of the ticket canceling mechanism broken away to show the relation of the inking, canceling and impression rollers; Fig. 11 is a detail view of the counter mechanism for computing the sum of the cash fares; Figs. 12 and 13 are detail views of the main driving gears; Figs. 14, 15, 16, 17, 18 and 19 are detail views of the counter construction for computing and registering the sum of the cash fares, showing the variable relation of gearing employed to register coins of different denominations; Figs. 20 and 21 are detail views of the ticket canceling rollers; Fig. 22 is a detail of the coin measuring arm, and lever for controlling the total cash counter; Fig. 23 is a detail view, taken on line D—D of Fig. 4, of the coin examination box showing the manner of engaging coins by the coin removing disk; Fig. 24 is a detail view of the supporting frame for the coin and ticket separating plates shown in Fig. 9; Fig. 25 is a detail view of the bell striker; Fig. 26 is a detail view of a modified form of construction of the coin examination box and of the mechanism for removing the coins therefrom; Fig. 27 is a side elevation of the mechanism shown in Fig. 26, with the outer casing broken away; Fig. 28 is a side elevation of the mechanism, slightly modified to adapt it to be driven by a motor; Fig. 29 is a front view of the motor construction and controlling mechanism; Fig. 30 is a detail of the circuit closer and breaker mechanism; Fig. 31 represents a full size record card for taking readings from the counters, and showing a representative record of the result of the fare registrations for one conductor's period of work; Fig. 32 is a guide and spacing bar used to properly position the record card when same is inserted in the recorder mechanism to take a reading from the counters; Fig. 33 represents a ticket showing the canceling marks thereon after the ticket has passed between the canceling rolls, and Fig. 34 is a detail view of the form shown in Fig. 26.

The invention comprises two main sections; the upper section A, forming the receiving box for the coins and tickets, the examination box for the coins, and inclosing the mechanism for separating the coins from the tickets, the ticket canceling rollers, and the mechanism for removing the coins from the examination box. The lower section B forms the main body of the device, inclosing the registering and recording mechanism and having suitable receptacles for the coins and tickets delivered from section A.

Referring to section A; 1 is the top cover of the fare receiving and ticket examination box C, and the ticket canceling box D, and has an opening 2 therein of suitable size to receive coins and tickets. The sides of section A are formed of plates 3, preferably made of glass or other transparent material, secured at their side edges with strips 4, and supported at their upper and lower edges respectively by the cover 1 and the base 5.

Contained within section A is the supporting frame 6, secured to base 5 and forming one wall of the coin examination box C, having at its upper portion bearings 7 supporting shaft 8 to which is secured at its lower end the gear 9. The upper end of shaft 8 is reduced in diameter forming a shoulder upon which rests bar 10 to which are secured the coin and ticket separating plates 11. The plates 11 are hinged to bar 10 in the manner shown in Fig. 9, permitting of free downward movement of the plates when moved clear of the supporting frame 12, as shown in Fig. 4. Each of the plates 11 has two holes 13 of suitable diameter to permit coins of the largest size to be registered to freely pass therethrough. The upper edges of holes 13 are beveled to prevent coins lodging on the plates 11. The rear portions of plates 11, in conjunction with bar 10, form a wall or partition to prevent coins entering the ticket canceling box. Frame 12 is semicircular in shape and is secured to frame 6 by screws as shown in Fig. 4. The ends of frame 12 are beveled, see Fig. 24, to engage the plates 11 when same are in their lower position, and cause the plates to be raised alternately during the operation of the mechanism, to their upper position. The shaft 8 makes one-half turn at each operation of the mechanism, causing one of the plates 11 to be moved from the upper to the lower position and vice versa. To the upper end of shaft 8 is secured the disk 14, having openings 15 corresponding in shape and size with the opening 2 in cover 1; one of said openings 15 registering with opening 2 when the mechanism is in normal position. The metal portions 16ª of disk 14, intervening between openings 15, act to close opening 2 to prevent fares being deposited in the receiver while the mechanism is being operated.

The frame 6 has a bearing 16 at its center supporting shaft 17 to which is secured at its upper end the disk supporting plate 18, and the coin disk 19. To the lower end of shaft 17 is secured gear 20, meshing with gear 21 on shaft 22, having bearings in the side walls of base 5. Also on shaft 17 is secured gear 23, meshing with gear 9 on shaft 8. By this arrangement of the parts the disk 19, the coin and ticket separating plates 11, and the disk 14 all move together in unison one-half turn at each operation of the machine.

The center portion of the frame 6 is depressed as shown at 24, permitting the disk supporting plate 18 to lie flush with the face of the frame, and causing the coin disk to move in close proximity with the surface of the frame. Made integral with frame 6 is a flange 25 on the outer edge of the frame, serving to confine the coins within the area swept by the coin disk 19. Secured to the bottom of frame 6 is a shield or plate 26 which engages the coins causing same to move into positions to be picked up by notches 27 of the coin disk 19.

To the lower surface of frame 12 is secured plate 32, which serves to guide coins deposited in the fare box to fall against the coin disk 19, thence to the bottom of the coin examination box E in position to be picked up by one of the notches 27 when the coin disk is actuated. In the upper portion of frame 6 is an opening 33, shown in dotted lines in Figs. 3 and 10, through which the coins pass, when carried upward from the examination box by the coin disk, into the coin chute 34 leading to the cash drawer F.

The measuring arm 29, pinned to shaft 30, having its bearing in frame 6, lies in the path of the coins as the same are swept upward by the coin disk and is moved outwardly under pressure of the coin a distance determined by the diameter of the coin. Also pinned to shaft 30 is the controlling lever 28 engaged at its free end to the selector gear of the coin-controlled counter the operation of which will presently be described. The measuring arm and controlling lever are normally pressed toward the coin disk 19 by a spring 31.

Secured to shaft 22 is gear 35 meshing with gear 36 pinned to shaft 37 having bearings in the side walls of the base 5 and carrying the ticket canceling roller 38. The gear 36 in turn meshes with gear 39 pinned to shaft 40 having bearings in frame 5 and carrying the impression roller 41. Adjacent to the canceling roller 38 and in contact therewith is the inking roller 42 supported on shaft 43 having bearings in the side walls of the base 5. Also secured to shaft 22 is gear 44 meshing with gear 45 on shaft 46 having its bearings in base 5 and connected at its outer end to the operating handle 47.

The mechanism described is designed to receive United States pennies, nickels and dimes; also Canadian dimes and half-dimes, and tickets or paper fares of variable size and form, to separate the coins from the tickets, to cancel the tickets and to remove the coins and tickets from the upper section of the fare box. The operation of the mechanism is as follows: When a coin is deposited in opening 2, it will fall upon the elevated plate 11, thence through one of the holes 13, against plate 32 and coin disk 19, to the lowermost position in the coin examination box against flange 25 where it will rest in exposed position, convenient to be examined by the conductor as shown in Fig. 23. To remove the coin from the examination box, the handle 47 is rotated one complete turn, moving disk 19 one-half turn through the medium of shaft 17, gear 20, gear 21, shaft 22, gear 44, gear 45, and shaft 46. With each half turn of the coin disk one of the notches 27 engages a coin, when a coin is in position to be registered, as shown in Fig. 23, and carries same into engagement with the measuring arm 29, where it is held in fixed relation to the measuring arm until the next operation of the handle 47 when the coin will be swept into opening 33 and enter the money drawer F through coin chute 34.

When a ticket or other paper fare is deposited in the fare receiver, the operation of the mechanism is the same as when a cash fare is received. Tickets, however, will not pass through holes 13, but will lie on plate 11 in a position to be examined by the conductor and, with the movement of plate 11, will be carried into the ticket canceling box D and, when plate 11 drops to its lowered position, the ticket will fall upon the canceling rolls and pass between the canceling rolls into ticket box G.

The registering and recording mechanism contained in section B of the machine comprises a plurality of counters 48, supported on shaft 49 having bearings in frame 50. Each of the counters 48 is provided with an actuating gear 51 keyed to shaft 52 in a manner permitting of free lateral movement of the gear on the shaft, but preventing rotary movement of the gear independent of the shaft. The shaft 49 also supports a counter 53 having an actuating member 54 keyed to shaft 52 in the same manner as gears 51. Also supported on shaft 49 is a counter 55, with an actuating gear 56 slidably secured to sleeve 57 and held in fixed rotative relation therewith by pin 58 in hub 59, engaging slot 60 of the sleeve 57. Gear 56 is held against lateral movement in either direction by plate 61 and collar 61$^A$ on shaft 70. Sleeve 57 has at its opposite end a gear 62, preferably formed integral of the sleeve, and at its middle portion a double flange member 63, clearly shown in Fig. 11, also formed integral of the sleeve. The flange 63 is engaged by the lower end of controlling lever 28, as shown in Fig. 3. It will thus be seen that with the movement of lever 28, the sleeve 57 and gear 62 are moved longitudinally of the shaft 52.

Adjacent to shaft 52 and sleeve 57 is a group of registering gears 64, 65, 66 and 67, a locking plate 68 and gear 69, pinned together, forming an integral part supported on shaft 70 and free to rotate thereon; the parts being held in position on the shaft by sleeves 70$^a$. The ends of shaft 70 are rigidly supported in the side frame 50 and plate 61. Gear 69 is driven by gear 71 pinned to shaft 52, the ratio of the gears being equal so that gear 69 is moved one-half turn with each half turn of gear 71.

When a coin engages the measuring arm 29, the controlling lever 28 is moved a distance determined by the diameter of the coin in contact with arm 29, and the gear 62 together with sleeve 57, is moved on shaft 52 across the face of the group of gears 64, 65, 66 and 67 until gear 62 is in position to mesh with the gear of the group of gears employed to register coins of the denomination of the coin engaged by the measuring arm.

Of the group of gears, gear 64 is employed to register nickels and is provided with the required number of teeth in each half section of the gear, see Fig. 16, to advance gears 62 and 56 one-half turn for each nickel registered; and the movement of gear 56, being in mesh with an equal gear secured to the units number wheel of counter 55, moves the number wheel one-half turn, causing five units to be added on the counter. Gear 65, being provided with but one tooth in each half section of the gear, as shown in Fig. 19, will in like manner cause one unit to be registered on the counter at each operation of the mechanism when a penny is in registering position under the measuring arm. Gear 66 is a full toothed gear, see Fig. 17, and moves each of the gears 62 and 56, one complete turn at each operation of the mechanism, registering ten units on the counter when a dime engages the measuring arm. Gear 67 is a duplicate of gear 64 and registers five units on the counter when a Canadian half-dime is being registered. The locking plate 68 is a disk of approximately the same diameter as the pitch diameter of gears 64, 65, 66 and 67, and holds the gear 62, in its normal or non-registering position, against rotary movement on shaft 52. The parts of the peripheries of gears 64, 65, and 67 unoccupied by gear teeth, also engage gear 62 and prevent rotation thereof during the non-registering intervals when gear 62 is actuated.

Pinned to gear 45, and supported on shaft 46 is a gear 72 engaging gear 73 secured on shaft 52 and rotating therewith. The relation of gears 72 and 73 is such that gear 73 and with it shaft 52 are moved one-half turn at each complete turn of gear 72 and operating handle 47. The part of the periphery of gear 72 unoccupied by gear teeth engages the teeth of gear 73 and acts as a lock to prevent rotation of gear 73 and shaft 52 during the registering movement except when the teeth of gear 72 are in mesh with the teeth of gear 73. Each of the counter actuating gears 51 and 54 are provided with two teeth and two locking surfaces intervening between the teeth to engage the gears on the unit wheels of the counters 48 and 53.

The main actuating gear 45 is provided with pins 45$^A$ and a pawl 45$^B$, engaged by spring 45$^C$. In the normal relation of the parts the upper arm of the pawl is pressed down by the spring into the path of the pins, and, with the rotation of gear 45 the foremost of the pins engages the lower edge of the upper arm of the pawl, lifting the pawl and moving the end of the lower arm into the path of the other pin, thereby locking the mechanism against further movement. When the operating handle is released, or the direction of the movement is slightly reversed, the pawl will be released by the pressure of spring 45$^C$, and the mechanism will be unlocked for further operation.

Secured to the inner wall of the case is a bell 74, provided with a bell striker 75, pivoted to a stud 76 normally held against a pin 77 by a spring 78. The end of the striker arm 79 protrudes through the stud 76 and is engaged by the gear 54 at each half turn of shaft 52, causing the bell hammer to vibrate and strike the bell to indicate an operation of the registering mechanism.

From the foregoing description it will be seen that with each turn of operating handle 47 the shaft 52 will be moved one-half turn. When a coin is in engagement with the measuring arm 29, the counter 55 will be actuated at each operation of shaft 52 to register the number of units represented by the value in cents of the coin in registering position. Also one unit will be added on counter 53 which counts the total of all fares registered. When a ticket or other paper fare is to be registered one of the gears 51, corresponding to the denomination of the fare to be registered, will be moved in mesh, as hereinafter described, with the gear of the corresponding counter 48 and one unit will be registered on the counter when the operating handle is rotated.

In the operation of the register it frequently happens that a ticket or transfer is registered simultaneously with the registration of the sum of a coin on counter 55 as the coin registering mechanism is actuated at each operation of the handle 47.

The counters employed in my invention may be of any well known construction, preferably of the Geneva lock type such as are clearly shown in Fig. 18 of the accompanying drawings.

Figs. 5 and 6 show detail views of the selector mechanism for classifying the fares. Formed in the lower ends of selector keys 80 are slots 81 engaging pins 82 secured at the upper end of bell cranks 83 pivoted to the frame 50 and connected at their lower ends with the operating gears 51 and 54. The keys 80 are also provided with pins 84 engaging respectively when the keys are depressed, with slots 85 of slightly different angles in key bar 86. The key bar 86 has slots 87 to permit of limited longitudinal travel of the key, and is provided with a spring 88 which normally draws the bar to the right. The pins 84 normally rest against spring 88, holding the keys 80 in their raised position. When one of the keys 80 is depressed the pin 84 engages spring 88 and forces the spring down, the tension of the spring acting to return the key to normal position when the key is released. The return of the keys is further assisted by the action of the notches 85 when the key bar returns to normal position. Formed at one end of key bar 86 are notches 89 in position to be engaged by pawl 90 provided with a pin 91 engaging with a tripping cam 92 pinned on shaft 52. Pawl 90 is normally held in engaging relation with teeth 89 and cam 92 by a spring coiled on stud 93.

When one of the keys 80 is depressed, the pin 84 engages the corresponding slot 85, see Fig. 5, and moves the key bar 86 to the left a distance corresponding to the angle of the engaged slot 85; the pawl 90 engaging the corresponding notch 89, holds the key bar against return movement under tension of spring 88, and the upper edge of the bar engages pins 84 of all the selector keys in normal position as shown in Fig. 5, locking same in raised position. The variable angles of slots 85 make it impossible to depress two of the selector keys at one time. With each half turn of shaft 52, the pawl 90 is lifted out of engagement with key bar 86 by tripping cam 92, and bar 86 and the depressed selector key are returned to normal position by spring 88.

Bell crank 83$^a$ is not directly controlled by one of the selector keys 80, but has a pin 82$^b$ engaging a slot 82$^c$ in locking bar 86. When bar 86 is in normal position the pin 82$^a$ is held in the lower extension of slot 82$^c$ and bell crank 83$^a$ is moved to the left, holding the corresponding actuating gear 51 in constant engagement with the gear of the units wheel of the corresponding counter 48. By this arrangement one of the counters 48, preferably the one employed to register the fares of the denomination of which the greatest number are used, is held normally engaged with its actuating gear 51 so that one unit will be registered on the counter at each operation of the mechanism, except when one of the selector keys is depressed, when movement of the locking bar 86, acting through slot 82$^c$, will move the bell crank to the right, and the actuating gear will be moved out of engagement with the counter.

Bell crank 83$^b$ is like bell cranks 83 except that its direction of movement is reversed, with the result that when the selector key is depressed the actuating gear to which it is connected is moved out of engagement with the counter. It will thus be seen that when the selector key controlling bell crank 83$^b$ and its corresponding actuating gear is depressed that all of the counters 48 and the counters 53 will be disengaged, and that the registering mechanism can then be operated without affecting any of the detail fare counters or the register total counter. This provision is made to enable the conductor to clear the examination box of any fares that may remain therein after the required number of operations have been made to register the fares received.

In the front and upper part of lower section B is a shaft 94, having bearings in side frames 50. Pinned to each end of the shaft are arms 95 supporting an inking roller 96 and an impression roller 97. One end of the shaft 94 extends through the outer wall of the case and has secured thereto a handle 98. To take an impression from the counters the handle 98 is moved upward carrying the inking roller across the face of the figures in printing alinement on the counters, and is then returned to its normal position. A suitable record card, preferably of the character shown in Fig. 31, is then inserted into the mechanism through slot 99, in position to receive the impression from the counters. The handle 98 is then moved downward carrying the impression roller 97 into engagement with the record card, pressing same against the type of the number wheels and printing a record therefrom. The card is removed from the mechanism after each printing operation, and the printing mechanism is returned to normal position, after both the inking and impressing operations, by a spring, not shown in the drawings, attached to shaft 94. Pinned to shaft 100 are arms 101 carrying at their upper ends a plate 102. When the impression roller is moved downward pins 103 in arms 95 engage arms 101 and move same out of the path of the pins, causing the plate 102 to press the record card against the tie bar of frame 50, preventing movement of the card during the printing operation. The arms 101 are normally held against pins 103 by a spring coiled on shaft 100.

The record card employed for taking the impressions from the counters is preferably provided with a margin, forming a guide or gage as shown in Fig. 30, for positioning the card when same is inserted into the printing slot. In connection with the marginal gage a locating clip, see Fig. 32, is employed. The clip slips over both edges of the card and when set to a given figure of the gage will position the card when same is inserted into the slot 99 to print the record for the trip of the corresponding number.

At the beginning of the run the conductor prints a record from the counters on the line indicated by the star, Fig. 31, and then prints a record for each trip in the order in which they are made. To find the result of the fare registrations at the end of the run the first reading is subtracted from the last reading and the amounts are entered in the total column. By this arrangement a classified record of the fare registrations, in detail and in totals, is obtained with a minimum of labor, and the record is in most convenient and legible form.

Figs. 26 and 27 illustrate a modified construction of the mechanism for removing the coins from the examination box. Referring to Fig. 26, the coin ejector bar 104 is actuated by the driving disk 105 carrying a pin 106 engaging slot 107 in bar 104. Disk 105 is supported by shaft 108 having its bearing in frame 6$^A$, and having pinned to its lower end gear 109 meshing with gear 110 on shaft 46. With each half turn of shaft 46 the ejector bar 104 is moved forward and returned in guideways 111 and 112 its maximum distance of travel. When a coin is in position in the examination box to be registered, the same will be engaged by bar 104 and moved under rollers 113 and 114 into engagement with the measuring arm 29$^A$, and the measuring arm will be raised a distance determined by the diameter of the coin, and through controlling lever 28, gear 62 will be moved into engagement with one of the gears 64, 65, 66 or 67 according to the denomination of the coin being registered. The relation of measuring arm 29$^A$ to controlling arm 28 is the same as in the regular form of construction, and the operation of parts to register the sum of the coins is identical with the mechanism described.

It will be observed, however, that in the modified construction the coins do not rest under the measuring arm, as in the regular construction, but are pushed past the measuring arm by bar 104 into coin chute 34$^a$. This arrangement requires that the measuring arm be locked in raised position, when moved by a coin, until the registering operation is completed. For this purpose a pawl 28$^a$, see Fig. 34, having notches 30$^a$, engaging with a tooth 31$^a$ on arm 28, is employed. The notches of pawl 28$^a$ correspond in number to the gears 64, 65, 66 and 67 and are spaced apart the required distance to hold gear 62 in engagement with one of the gears 64, 65, 66 or 67 according to the coin being registered. Controlling lever 28 normally rests against pin 32$^a$, and the pawl 28$^a$ is held against tooth 30$^a$ by a spring 33$^a$. Shaft 46 is provided with a pin 34$^b$ extending through the shaft and having its ends projecting on both sides thereof in position to engage a projection 35$^a$ of pawl 28$^a$, lifting the pawl out of engagement with tooth 31$^a$ and releasing lever 28 to return to normal position.

The rollers 113 and 114 serve to engage the coins when same are pushed forward in guideway 111 and 112 and press the same against the rear wall of the guideway to properly position the coins under the measuring arm 29$^a$. The roller 113 is of larger diameter than roller 114 and acts to prevent two coins being pushed forward at the same time. The rollers 113 and 114 are supported on arms 115, pivoted at 116, and normally held in position to engage the coins by springs 117.

Under certain conditions of service, it has been found desirable to operate fare registers and fare boxes with motor power, and I have shown in Figs. 28, 29 and 30 of the drawings a modified construction comprising an electric motor and attachments connecting the same to the main actuating mechanism of the register.

Shaft 118 is connected to motor 119 by means of clutch 120 and worm gears 121 and 122. Clutch 120 is held normally engaged with gear 121 by spring 123, the upper part of the clutch being free to move slidably on the shaft but held in fixed rotative relation therewith by key 124. At the upper end of shaft 118 is a sleeved gear 125 telescoping the shaft but free to rotate independently thereof, and meshing with gear 126 pinned to shaft 46 of the registering mechanism. The lower end of the sleeve of gear 125 forms half of the clutch 127, the lower half of the clutch being keyed to shaft 118, free to slide thereon but held in fixed rotative relation therewith, and moved into engagement with the upper half of the clutch by a spring 128 supported on shaft 118 by collar 118ᵃ.

Pinned to the main actuating gear 45 is a plate 129 having a notch 130 engaged by pawl 131 pivoted at 132 and normally held in engagement with the notch 130 by spring 133. These parts serve to overcome the momentum of the operating mechanism and bring the same to a stop at the completion of each operation.

In Figs. 29 and 30 of the drawings is shown the manner of forming the circuit closer and breaker for controlling the motor, the key locking bar 86 being employed for this purpose. To the end of bar 86 is secured a shoe 134, as shown in Fig. 30, of insulating material which, when the key bar is moved forward by compressing one of the fare selector keys, engages the end of a spring plate 135 and presses the plate down in contact with plate 136 closing the circuit and thereby starting the motor. When the compression key is released the bar 86 is drawn back by spring 88 and the contact between plates 135 and 136 is broken, stopping the motor. Locking bar 86 is provided with an extended arm 137 engaging flange 127ᵃ of the lower member of clutch 127, holding the clutch disengaged when the parts are in normal position. When bar 86 is moved to the left, arm 137 moves out of engagement with flange 127ᵃ releasing clutch 127 to become engaged with the upper clutch member when the motor is started. The clutch is disengaged at the end of each operation with the return of key bar 86 to normal position.

Gears 125 and 136 are rotated one complete turn at each actuation of the motor, actuating the mechanism of the register in the same manner and to the same extent as one turn of the operating handle when the mechanism is operated manually. Clutch 120 is provided with a spring 123 for the purpose of preventing excessive strain on the registering mechanism if the same should be locked or become inoperative when the motor is actuated. In such event spring 123 would yield and the upper member of clutch 120 would be moved out of engagement with the lower member of the clutch, permitting shaft 118 to remain stationary.

The construction and operation of the machine will be readily understood from the foregoing description. To summarize briefly, it will be observed that I have combined in my invention in a single or unitary device, with respect to both the construction and operation thereof, the functions of a multiple fare register and recorder, a coin-controlled registering fare box provided with a single receptacle adapted to receive cash fares of various denominations and tickets; mechanism to separate the cash fares from the tickets, and mechanism to cancel the tickets; all in full view of passengers entering the car and of the conductor in charge of the fare box; means to fully classify the registration of the fares and to obtain a printed record of the result in detail for each trip and in total for each period of work; the record being in most convenient form for the conductor's use and for office checking and filing. The arrangement of the mechanism is such as will enable the conductor to properly classify and register the fares with the minimum of effort. And efficient safeguards are provided against errors or irregular manipulation. The mechanism is simple in construction, strong and durable, and adapted in all respects to the purposes of the invention.

Experience has taught that a double-check system of fare collecting is a far more effective safeguard against involuntary errors and omissions of registration, as well as against the voluntary irregularities practised by dishonest employees, than any single system of registration. Under the double-check system one record of registration checks the other, and discrepancies between the records being immediately apparent, the cause can easily be removed or corrected. My invention is especially adapted to meet these requirements, as all cash fares are beyond control of the conductor until the same have been mechanically registered through the fare box, making an unalterable record of the accumulated amount in dollars and cents which forms the basis upon which the conductor settles with the company. The detail and total counters serve as a check against the total cash counter and vice versa. These functions are most conveniently carried out in the invention because of the integral construction of the mechanism, and the ease and facility with which the fares are collected, classified and recorded.

It will be apparent that the exact construction and arrangement of parts is not, in most instances, the essence of the invention, as the construction and arrangement of the parts may be greatly varied without departing from the essential ideas or spirit of my invention. I wish it to be understood, therefore, that I do not desire to be limited to the details of construction shown and described, for obvious modifications will occur to persons skilled in the art.

Having thus fully described my invention, what I claim as new and desire to secure by Letters Patent, is:—

1. In a registering fare box, a casing having an opening through which both coin and paper ticket fares may be deposited therein, a separating device arranged in said casing to receive the fares deposited therein and separate the coins and tickets, said casing also having a sight opening through which the fares therein may be inspected after they have been delivered to said separating device, a coin controlled registering device to register the value of the coins so separated, and an operating device to actuate said separating device and said registering device.

2. In a registering fare box, a casing having an opening through which both coin and paper ticket fares may be deposited therein, a separating device to receive the fares deposited in said casing and to separate the coins and tickets, a passenger register to register all the fares deposited in said casing, a coin controlled register to register the value of the coins after they have been separated from the tickets, an operating device to actuate both of said registers and said separating device, and means to disconnect said passenger register from said operating device without interfering with the operation of the separating device and the coin register.

3. In a registering fare box, a casing having an opening through which both coin and paper ticket fares may be deposited therein, a separating device to receive the fares deposited in said casing and to separate the coins and tickets, a passenger register to register all the fares deposited in said casing, a coin controlled register to register the value of the coins after they have been separated from the tickets, an operating device to actuate both of said registers and said separating device, and manually operated means to disconnect said passenger register from said operating device without interfering with the operation of the separating device and the coin register.

4. In a registering fare box, a casing having an opening through which both coin and paper ticket fares may be deposited therein, a separating device to receive the fares deposited in said casing and to separate the coins and tickets, an operating device for said separating device, a register to register the fares deposited in said casing, a normally operative connection between said register and said operating device to cause a unit to be registered upon each operation of said device, and means to render said connection inoperative to permit said separating device to be operated independently of said registering device.

5. In a registering fare box, a casing having an opening through which both coin and paper ticket fares may be deposited therein, a separating device to receive the fares deposited in said casing and to separate the coins and tickets, an operating device for said separating device, a register to register the fares deposited in said casing, a normally operative connection between said register and said operating device to cause a unit to be registered upon each operation of said device, and means to render said connection inoperative to permit said separating device to be operated independently of said registering device and to automatically restore said connection at the end of said operation.

6. In a registering fare box, a casing having an opening through which both coin and paper ticket fares may be deposited therein, a separating device to receive the fares deposited in said casing and to separate the coins and tickets, an operating device for said separating device, a passenger register to register the fares deposited in said casing, a connection between said register and said operating device to cause a unit to be registered on said passenger register upon each operation of said operating device, and means to render said connection inoperative to permit the separating device to be operated independently of the register.

7. In a registering fare box, a casing having an opening through which both coin and paper ticket fares may be deposited therein, a separating device to receive the fares deposited in said casing and to separate the coins and tickets, an operating device for said separating device, a passenger register to register the fares deposited in said casing, a connection between said register and said operating device to cause a unit to be registered on said passenger register upon each operation of said operating device, a coin controlled register to register the value of the coins, an operative connection between said coin controlled register and said operating device, and means to disconnect the first-mentioned register from said operating device to permit said separating device and said coin controlled register to be operated independently thereof.

8. In a registering fare box, a casing having an opening through which both coin and ticket fares may be deposited therein, a separating device to receive the fares deposited in said casing and separate the coins and tickets, a plurality of normally inoperative counters to register the units of fares separately, selector mechanism to render any one of the first-mentioned counters operative, a coin controlled counter to register the value of the coins, and an operating device to actuate said separating device and said counters.

9. In a registering fare box, a casing having an opening through which both coin and ticket fares may be deposited therein, a separating device to receive the fares deposited in said casing and separate the coins and tickets, a plurality of normally inoperative counters to register the units of fares separately, selector mechanism to render any one of said counters operative, a counter actuated upon each operation of said machine to register the total of fares, a coin controlled counter to register the value of coins, and an operating device to actuate said separating device and said counters.

10. In a machine of the character described; mechanism to register fares, operating mechanism therefor, a counter connected with said operating mechanism to register the units of fare, and a counter connected with said operating mechanism and controlled by fares in said registering mechanism to register the value of fares, means to disconnect the first named counter from the operating mechanism to prevent registration of units of fare without preventing said operating mechanism from being actuated to register the value of fares.

11. In a machine of the character described; mechanism to register fares, operating mechanism therefor, a plurality of counters connected therewith to register the units of fare and the total of fares respectively, and a counter controlled by the fares in said registering mechanism to register the value of fares, means to disconnect the first named counters from the operating mechanism to prevent registration thereon without preventing said operating mechanism from being actuated to operate the last named counter.

12. In a machine of the character described, a passenger register to register all the fares received, a fare controlled register to register the value of fares, an operating device for actuating said registers, and means to disconnect said passenger register from said operating device to permit the fare controlled counter to be operated by said operating device independently of said passenger register.

13. In a registering fare box for coin and paper ticket fares, a register to register fares of both kinds received, a coin controlled register to register the value of the coins, an operating device to actuate said registers, and means to disconnect said operating device from the first-mentioned register.

14. In a machine of the character described; registering mechanism for fares, operating mechanism therefor, a member having a plurality of devices any one of which may engage a fare and position the same to control said registering mechanism to register the value thereof and remove said fare from the registering mechanism by successive actuations of said operating mechanism.

15. In a machine of the character described; registering mechanism for fares, operating mechanism therefor, an operable member having a plurality of devices any one of which may engage a fare and move the same to control the registering mechanism to register the value thereof, and another of said devices may remove a fare engaged thereby from said registering mechanism, and the value of the fare so removed be registered when said operating mechanism is actuated.

16. In a machine of the character described; registering mechanism for fares, operating mechanism therefor, a disk having a notch and movable by successive actuations of said operating mechanism to cause said notch to engage a fare and position the same in said registering mechanism to cause registration of the value of said fare and remove the same from the registering mechanism.

17. In a machine of the character described; registering mechanism for fares, operating mechanism therefor, a disk having a plurality of notches and movable by actuating said operating mechanism to cause one of said notches to engage a fare and position the same in said registering mechanism and the other of said notches to remove a fare engaged thereby from the registering mechanism, whereby the value of the fare so removed will be registered when said operating mechanism is actuated.

18. In a registering fare box, a plurality of registering devices, each having printing counters, an actuating device for said registers arranged to cause one of said registers to register fares received, fare controlled means to cause another of said registers to register the value of fares, a guide-way arranged adjacent to the printing counters of said registers and adapted to receive a card, and means for pressing said card into engagement with said printing counters to cause a record to be taken therefrom.

19. In a registering fare box, a plurality of registering devices, each having printing counters, an actuating device for said registers arranged to cause one of said registers to register fares received, fare controlled means to cause another of said registers to register the value of fares, a guide-way arranged adjacent to the printing counters of said registers and adapted to receive a card, and means for inking said printing counters before a card is inserted and for pressing said card into printing engagement with said counters to cause a record to be taken therefrom.

In testimony whereof, I affix my signature in presence of two witnesses.

DAVID B. WHISTLER.

Witnesses:
C. C. WHISTLER,
A. W. GARDES.

Copies of this patent may be obtained for five cents each, by addressing the "Commissioner of Patents, Washington, D. C."